(12) United States Patent
Ogawa

(10) Patent No.: US 6,493,537 B1
(45) Date of Patent: Dec. 10, 2002

(54) APPARATUS AND METHOD FOR PREVENTING OSCILLATIONS IN A RADIO REPEATER DEVICE

(75) Inventor: Noboru Ogawa, Machida (JP)

(73) Assignee: Harada Industry Co., Ltd., Tokyo (JP)

( * ) Notice: Subject to any disclaimer, the term of this patent is extended or adjusted under 35 U.S.C. 154(b) by 0 days.

(21) Appl. No.: 09/538,420

(22) Filed: Mar. 29, 2000

(30) Foreign Application Priority Data

Mar. 31, 1999 (JP) ............................................. 11-093960

(51) Int. Cl.$^7$ .............................................. H04B 17/02
(52) U.S. Cl. ............................. 455/9; 455/67.1; 455/24
(58) Field of Search ........................ 455/15–24, 7–11.1, 455/13.1, 67.1–67.4, 423, 117, 226.1, 226.2, 230, 127, 63

(56) References Cited

U.S. PATENT DOCUMENTS

| 4,479,245 A | | 10/1984 | Batlivala et al. ............... 455/18 |
| 4,776,032 A | * | 10/1988 | Odate et al. ................... 455/24 |
| 5,812,933 A | * | 9/1998 | Niki ............................. 455/16 |
| 5,835,848 A | * | 11/1998 | Bi et al. ........................ 455/24 |
| 6,009,324 A | * | 12/1999 | Pravitz et al. ............... 455/423 |
| 6,385,435 B1 | * | 4/2000 | Lee .............................. 455/24 |

FOREIGN PATENT DOCUMENTS

GB 2 258 586 A 2/1993

OTHER PUBLICATIONS

Isberg et al., Performance Tests of a Low Power Cellular Enhancer in a Parking Garage, Published on May 1, 1989.

* cited by examiner

*Primary Examiner*—Nguyen T. Vo
*Assistant Examiner*—Duc Nguyen
(74) *Attorney, Agent, or Firm*—Pennie & Edmonds LLP

(57) ABSTRACT

A radio repeater device, which can mutually communicate by relay of a vehicular terminal with a base station, comprises a first antenna to communicate with the base station, a second antenna to communicate with the vehicular terminal, and a repeater section which is connected with the first antenna and the second antenna, and to relay the base station and the vehicular terminal to be able to communicate therebetween, and, when the first antenna receives the signal from the vehicular terminal, an operation of at least the repeater section is stopped.

4 Claims, 2 Drawing Sheets

APPARATUS AND METHOD FOR PREVENTING OSCILLATIONS IN A RADIO REPEATER DEVICE

CROSS-REFERENCE TO RELATED APPLICATIONS

This application is based upon and claims the benefit of priority from the prior Japanese Patent Application No. 11-093960, filed Mar. 31, 1999, the entire contents of which are incorporated herein by reference.

BACKGROUND OF THE INVENTION

The present invention relates to, for example, a radio repeater device which relays between a base office and a vehicular terminal in a communication method of an FDMA method.

The current service system of the radio base station is as follows. Digital and the analog cable signals are converted into the base band which should be made a radio, and is digitized by the time-division and the FDMA (Frequency-Division Multi-Access) method. The multiple radio communication is performed by the number of channels corresponding to the office line.

The radio base station is set through the minute field examination, and the approach line design and the transmission propagation examination. However, the region to which service other than coverage are not received as shown in FIG. 1 exists in the vehicular communication. This region is called "Blind zone".

The radio repeater device enables the communication between the vehicular terminal in the blind zone and the above-mentioned radio base station. Therefore, this radio repeater device is a specification of government-managed or based on this.

The vehicular communication can be called public works, and, naturally, the radio repeater device to which the evil is given since the evil is not given to this communication network to this communication network should not be set up.

However, even if the radio repeater device of the operation between the base stations without trouble at time when it is set up, thereafter, the evil is occasionally caused for the communication network by the change in the environment in the surrounding. This cause will be explained referring to FIG. 2.

To enable the communication between base station 15 and vehicular terminal 25, the radio repeater device has a first antenna 10 (hereafter, called as "external antenna" for convenience' sake) and a second antenna (hereafter, called as "internal antenna" for convenience' sake) set up in the blind zone as shown in FIG. 2. The blind zone is solved by being possible to communicate mutually by sending and receiving wave with each of antennas 10 and 25, and base station 15 or vehicular terminal 25. In addition, this radio repeater device has first and second antenna shared devices 31 and 36, first and second band-pass filters 32 and 37, and first and second amplifiers 33 and 38.

Here, the signal from the base station received by external antenna 10 is input to first shared device 31. Next, only the signal of the desired frequency can pass by first filter 32. Thereafter, the reception signal amplified with first amplifier 22 is input to second shared device 36, the signal is sent to internal antenna 20, and the signal is sent from internal antenna 20 to vehicular terminal 25. The signal from vehicular terminal 25 is received with internal antenna 20, and processed with second filter 37 and second amplifier 38 through second shared device 36 as well as the signal received with external antenna 10. The signal received from first shared device 31 to external antenna 10 with internal antenna 20 is sent to base station 15.

Thus, the communication of vehicular terminal 25 in the blind zone becomes possible.

However, the radio repeater device operates same as the oscillation circuit when the signal from vehicular terminal 25 reaches external antenna 10, as a result, the phenomenon in which the radio repeater device is saturated and oscillates occurs. Therefore, the following disadvantages are occurred. Use of vehicular terminal 25 in the circumference according to the concerned radio repeater device becomes impossible. The relay of other radio repeater devices may be obstructed by generating the noise signal from external antenna 10 or internal antenna 20 caused by the oscillation.

It is necessary to prevent the signal from vehicular terminal 25 from reaching an external antenna not to occur this disadvantage. However, at first, even if it is a structure that the signal of vehicular terminal 25 does not reach an external antenna, the leakage of the relay carrier etc. can happen by a remarkable change in the environment in the surrounding according to the building construction others and the earthquake accident, etc.

As described above, the conventional radio repeater device has the disadvantage that the radio repeater device oscillates because of reaching the signal from vehicular terminal 25 to an external antenna of the radio repeater device.

BRIEF SUMMARY OF THE INVENTION

An object of the present invention is to provide a radio repeater device which solves problem because of oscillation of the radio repeater device caused by leakage of relay carrier etc. etc.

The present invention adopts the following means to solve the above-mentioned problem.

The radio repeater device, which can mutually communicate by relay of a vehicular terminal with a base station, according to the present invention is characterized by comprising: a first antenna to communicate with the base station; a second antenna to communicate with the vehicular terminal; and a repeater section which is connected with the first antenna and the second antenna, and to relay the base station and the vehicular terminal to be able to communicate therebetween, wherein when the first antenna receives the signal from the vehicular terminal, an operation of at least the repeater section is stopped. Here, stop of the operation of the repeater section is performed by stopping a supply of a power supply to the repeater section.

Specifically, the radio repeater device, which can mutually communicate by relay of a vehicular terminal with a base station, according to the present invention is characterized by comprising: a repeater section which can communicate and is the relay of the base station and the vehicular terminal; a pilot signal generation section which sends the pilot signal for the monitor to the repeater section; and a reception controller by which the signal from the repeater section is input, and the operation of the repeater section is stopped at least when intensity is larger than predetermined signals which become standards. Another radio repeater device, which can mutually communicate by relay of a vehicular terminal with a base station, according to the present invention is characterized by comprising: a first antenna to communicate with the base station; a second antenna to communicate with the vehicular terminal; a repeater section which is connected with the first antenna and the second antenna, and to relay the base station and the vehicular terminal to be able to communicate therebetween; and a stop section, when the first antenna receives the signal from the vehicular terminal, to stop an operation of at least the repeater section.

In above-mentioned radio repeater device, preferable manners are as follows.

(1) The pilot signal generation section which sends a pilot signal for a monitor to the repeater section is further provided.

(2) The stop section comprises a reception controller which inputs a signal from the repeater section and stops an operation of at least the repeater section when intensity of the input signal is larger than a predetermined signal which is a standard signal.

(3) The reception controller comprises a comparator which compares the input signal and the predetermined signal and outputs a result thereof and a switch which turns off a power supply of a power supply section which supplies a power supply to the repeater section based on the comparison result.

With above-mentioned configuration, even when the signal from the vehicular terminal leaks to outside and is received by the external antenna, when the signal intensity of the repeater section becomes larger than predetermined intensity (that is, when it becomes a state in which the repeater is saturated and oscillates) by always monitoring the signal in the repeater section, since the operation is stopped, the adverse effect is never caused to other devices. Therefore, it is possible to provide an improved repeater device in the blind zone. Even in a case that the signal is leaked by the change in the environment, since the operation of the repeater device is similarly stopped, the adverse effect is never caused to other devices.

Therefore, according to the present invention, it is possible to provide a radio repeater device which can communicate between the blind zone and coverage without adversely affecting other devices.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
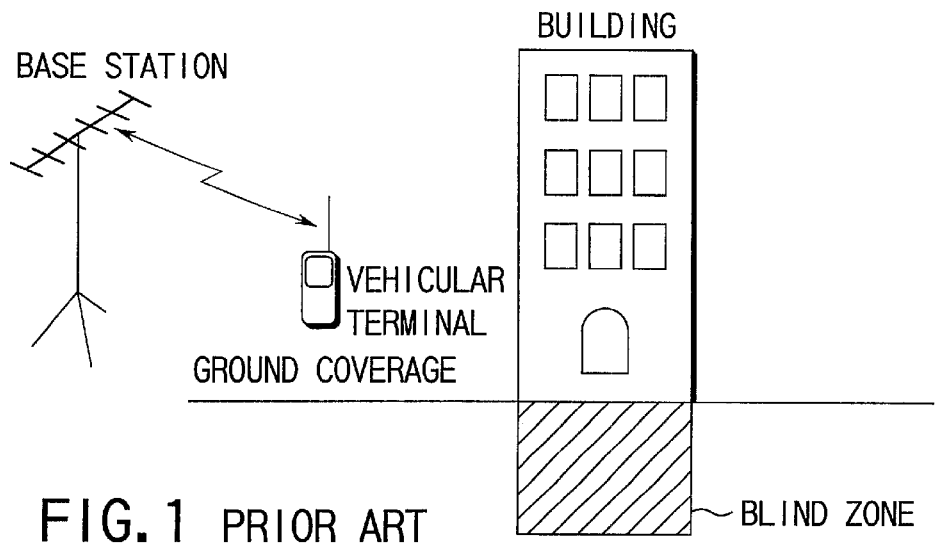
FIG. 1 is a conceptual diagram of the radio repeater device.

The embodiment of the present invention will be explained referring to the drawings.

Present invention is characterized in that the operation of the radio repeater device is stopped or paused when fear such that the radio repeater device oscillates is caused.

Figure 2:
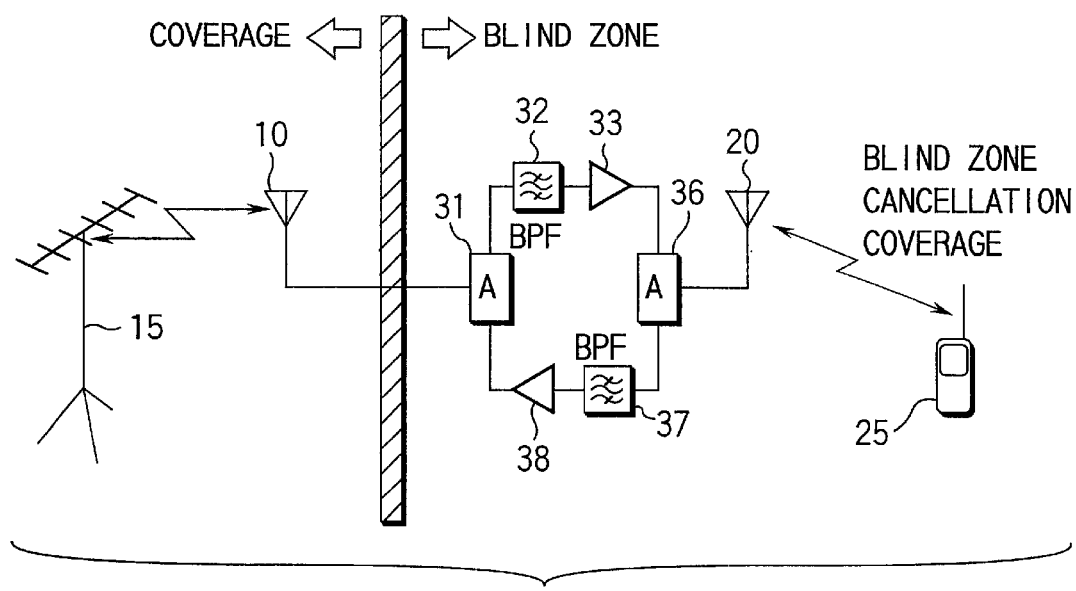
FIG. 2 is a figure to explain the method of solving the blind zone with the conventional radio repeater device.
Figure 3:
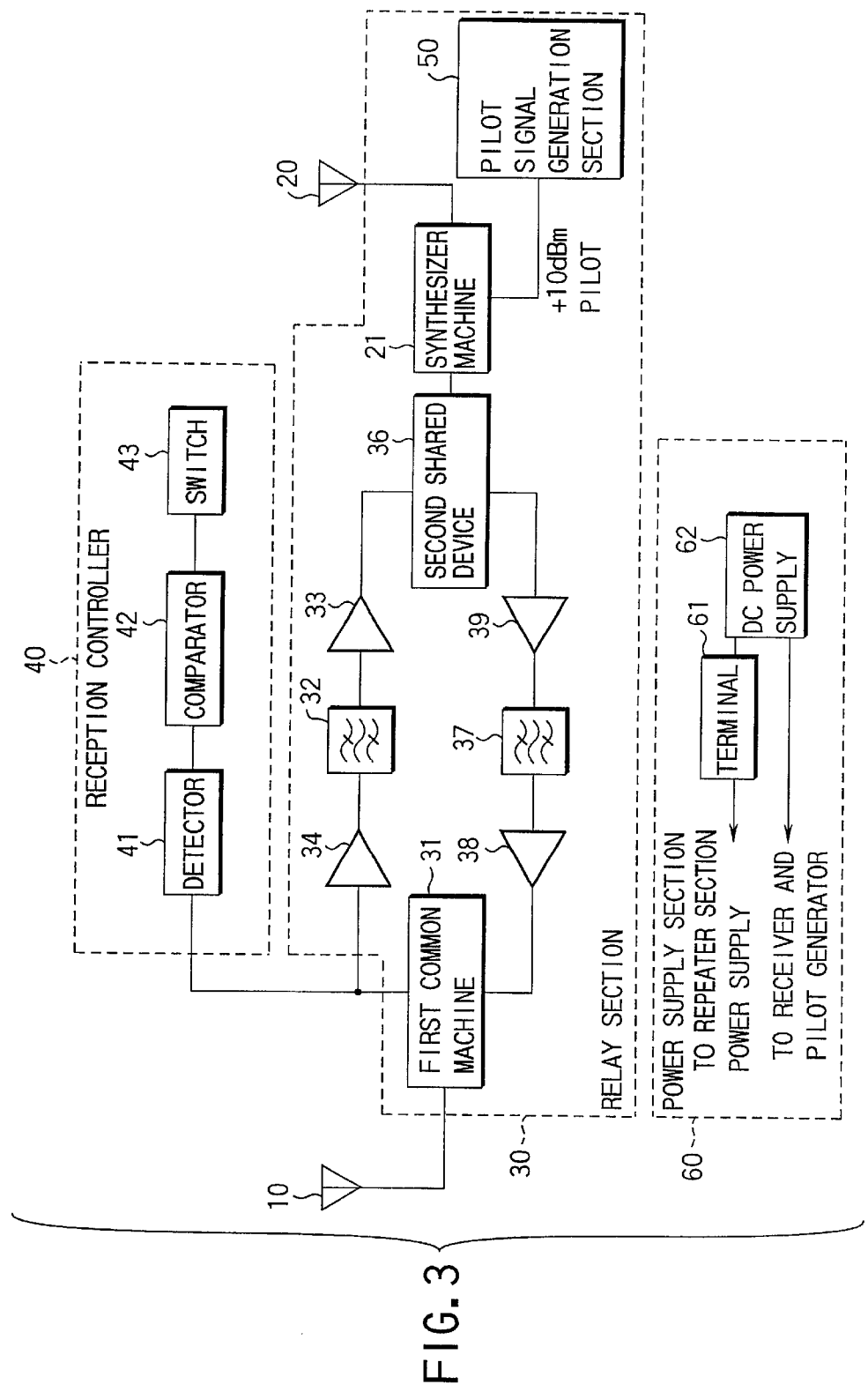
FIG. 3 is a figure which shows configuration of the radio repeater device according to present invention.

The specific circuit configuration is shown in FIG. 3. FIG. 3 is an example of the circuit to stop or pause the operation of the radio repeater device according to the present invention, and the circuit configuration is not limited to this. In FIG. 3, the same mark is fixed to the same part as FIG. 2, and a detailed explanation will be omitted.

The present invention differs from conventional ones at a point of newly adding reception controller 40 and pilot signal generation section 50. Third and fourth amplifiers 34 and 39 are newly arranged in a previous stage of the first and second filters to repeater section 30, this configuration is applied to a general repeater device which is not a configuration applied only to the present invention, since this is provided to amplify the reception signal with the antenna.

Configuration and operation of the radio repeater device according to the present invention will be explained specifically.

Reception controller 40 has detector 41, comparator 42, and switch 43.

Detector 41 demodulates the signal received with external antenna 10. Comparator 42 compares, for example, the reference level (voltage and current, etc.) with the detection signals and outputs the comparison result. Specifically, comparator 42 has the input terminal of the threshold level (standard value) and the input terminal of the signal, and outputs the predetermined signal when the level of the input signal exceeds the threshold level. Switch 43 controls turning-on or turning-off of the power supply of the radio repeater device based on the comparison result of comparator 42. Specifically, switch 43 is constructed by the relay, and is turned on according to an output of comparator 42, but is usually turned off.

Pilot signal generation section 50 generates the signal, for example pilot signal of 10 dBm so that external antenna 10 receives it. The pilot signal is input to repeater section 30 through synthesizer 21.

Terminal 44 of switch 43 is connected with power supply 60 and power supply 60 can be turned on and turned off by switch 43. Terminal 44 is constructed by, for example, the contact of the relay.

Operation of the radio repeater device according to present invention constructed as described above will be explained specifically.

First, repeater section 30 of the radio repeater device operates normally because of not becoming an oscillation circuit even if the pilot signal is input to synthesizer 21 in a usual state (state without the leakage).

Next, repeater section 30 is saturated when there is a leakage to external antenna 10. Repeater section 30 synchronizes with the pilot signal from the pilot signal generation section 50 and oscillates when the saturation signal is input to reception controller 40. As a result, the level of the signal input to reception controller 40 becomes very large. When this input signal level exceeds the threshold level input to comparator 42, since switch 43 is turned on, terminal 44 of switch 43 operates to turn off the power supply of repeater section 30.

As described above, in the present invention, since the signal level in repeater section 30 is monitored and the operation of repeater section 30 is stopped when the signal from vehicular terminal 25 reaches external antenna 10 and the signal level in repeater section 30 exceeds the predetermined threshold level, the adverse effect to circumference because of generating the noise signal caused by oscillating by the radio repeater device can be avoided.

The radio repeater device, in which operation is stopped once, stops the oscillation operation by turning off the power supply to repeater section 30, repeater section 30 starts the operation if the signal level is below the threshold level, and repeater section 30 maintains the stop condition if the signal level is larger than the threshold level.

In the above-mentioned embodiment, the pilot signal from pilot signal generation section 50 is assumed to be +10 dBm. It is not limited to this, and it may be a value to which the signal level can be monitored enough.

Though the signal is input to comparator 42 through detector 41 in reception controller 40, detector 41 may be omitted when the A/D converter is used.

Though switch 43 is controlled by comparing the signal level with the threshold level by comparator 42, it is not limited to this. Switch 43 may be operated when the signal level exceeds the predetermined threshold level, for example, by combining the diode and the transistor, and the level of the signal may be detected by resistance etc.

In addition, though in the embodiment, the example, in which switch 43 is constructed, for example, by the relay, is shown, it is possible to use the switching element, which operates similar switching operation to the relay, as switch 43.

In above-mentioned embodiment, though relay section 30 turns off the power supply, it is not limited to this, a configuration in which all parts except the reception controller are turned off may be possible and a configuration such that the object of the present invention is satisfied may be possible.

The present invention is not limited to the above-mentioned embodiments, it is possible to execute by transforming them within the scope of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A radio repeater device, which can mutually communicate by relay of a vehicular terminal with a base station, comprising:

a first antenna to communicate with the base station;

a second antenna to communicate with the vehicular terminal; and a first duplexer connected with said first antenna;

a second duplexer connected with said second antenna;

a repeater section which can communicate and is the relay of said base station and said vehicular terminal;

a pilot signal generation section which sends the pilot signal for monitoring to said repeater section;

a synthesizer which is arranged between said second duplexer and said second antenna and is connected with said pilot signal generation section; and a reception controller which is connected with said first duplexer, in which a signal from said repeater section is input to said reception controller, and the operation of said repeater section is stopped when an intensity of the signal is larger than a predetermined intensity level of standard signal.

2. The radio repeater device according to claim 1, wherein said reception controller comprises a comparator which compares said input signal and said predetermined signal and outputs a result thereof and a switch which turns off a power supply section for supplying a power supply to said repeater section based on the comparison result.

3. The radio repeater device according to claim 1, wherein a stop of the operation of said repeater section is performed by stopping supplying a power supply to said repeater section.

4. The radio repeater device according to claim 1, wherein a stop of the operation of said repeater section is performed by cutting of a power supply to said repeater section.

\* \* \* \* \*